(12) United States Patent
Frulla et al.

(10) Patent No.: US 6,424,357 B1
(45) Date of Patent: Jul. 23, 2002

(54) VOICE INPUT SYSTEM AND METHOD OF USING SAME

(75) Inventors: Roberto E. Frulla, Temecula; Joseph Kirby, Calsbad, both of CA (US)

(73) Assignee: Touch Controls, Inc., Fallbrook, CA (US)

( * ) Notice: Subject to any disclaimer, the term of this patent is extended or adjusted under 35 U.S.C. 154(b) by 0 days.

(21) Appl. No.: 09/263,182

(22) Filed: Mar. 5, 1999

(51) Int. Cl.$^7$ ................................................ G06F 3/00
(52) U.S. Cl. .................. 345/728; 345/716; 345/727; 345/978
(58) Field of Search ................. 345/326, 333, 345/978, 156, 157, 145, 716, 727, 728, 729, 856, 629

(56) References Cited

U.S. PATENT DOCUMENTS

| | | | | |
|---|---|---|---|---|
| 5,305,244 A | * | 4/1994 | Newman et al. | 708/141 |
| 5,359,703 A | * | 10/1994 | Robertson et al. | 345/419 |
| 5,748,191 A | * | 5/1998 | Rozak et al. | 345/333 |
| 5,818,423 A | * | 10/1998 | Pugliese et al. | 345/157 |
| 5,874,939 A | * | 2/1999 | Galvin | 345/156 |
| 5,974,384 A | * | 10/1999 | Yasuda | 704/275 |
| 6,072,482 A | * | 6/2000 | Moon et al. | 345/333 |

\* cited by examiner

Primary Examiner—John Cabeca
Assistant Examiner—Kieu D. Vu
(74) Attorney, Agent, or Firm—Foley & Lardner; Bernard L. Kleinke

(57) ABSTRACT

A voice input system has a microphone coupled to a computing device, with the computing device typically operating a computer software application. A user speaks voice commands into the microphone, with the computing device operating a voice command module that interprets the voice command and causes the graphical or non-graphical application to be commanded and controlled consistent with the use of a physical mouse. In one form of the invention, voice commands are overlayed on normal command points of the application program. Such voice commands are stored in a separate voice command repository, with an edit mode provided to create new voice command sequences and to edit existing voice command sequences.

32 Claims, 3 Drawing Sheets

VOICE INPUT SYSTEM AND METHOD OF USING SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The field of the present invention is input devices for computing devices and a method of using the input device. More particularly, the present invention relates to the control of a computer device with voice inputs.

2. Background Art

Many modern computing devices have a graphical user interface where a user interacts with the computer using a graphical input device. For example, the well-known and ubiquitous personal computer is most often configured to operate the popular "Microsoft Windows™" graphical user interface. The graphical user interface and graphical applications operating thereupon typically require the user to select graphical display elements to control and command the personal computer. Therefore, the personal computer is most conveniently operated using a graphical input device.

In this manner, a user typically uses the graphical input device for directly controlling the graphical elements of the graphical user interface and to activate commands. In some instances, the graphical input device works in conjunction with a keyboard to more efficiently enter commands and control a graphical application. There are many different types of graphical input devices in use today. Some of the most popular are graphics tablets, touch screens, digitizers, light pens, and trackballs. However, by far the most popular graphical input device is the standard computer "mouse".

The standard mouse comprises a housing to be manipulated by the palm of the hand. The bottom side of the mouse has a roller ball for contacting a flat horizontal surface. As the user propels the mouse along the flat horizontal surface, the roller ball provides relative left and right movements to mouse circuitry in the computing device. These relative left and right movements are communicated to the graphical driving system of the personal computer, where the relative mouse movements are converted to relate to the graphical coordinate system used on the Windows™ graphical user interface. In such a manner, left and right movements of the mouse across the flat horizontal surface are converted into left and right movements across the display for the computing device.

Most often, the movement of the mouse is represented on the display of the computing device by the position of a graphical cursor. The graphical cursor may take many shapes or forms such as an arrow or a cross hair. Thus, by moving the mouse, the cursor may be made to move to any location on the display and point to any location.

The typical mouse further has buttons for providing additional control and command functions. A mouse may be configured with any number of buttons, however most applications today are configured to operate best with a two button mouse. Typically, the mouse buttons are referred to as the "left mouse button" and the "right mouse button" relative to the front of the mouse.

Each mouse button has particular functionality as defined by the operating system. The Windows™ operating system usually provides that the mouse functionality be done with the left mouse button. For example, the left mouse button may be used to input commands to the Windows™ operating system. In such a manner, the mouse is used to move a graphical cursor to a command name on a Windows™ command line. The left mouse button is depressed once (a click). After the mouse button has been clicked, a drop down menu appears and a sub-menu of available commands appears. The user then actuates the mouse to move the pointer (cursor) to the desired command and then clicks the left mouse button. Once the command has been clicked with the left mouse button, the command is performed.

Additionally, several commands are activated by depressing the left mouse button twice in rapid succession (called a double click). In many programs, such as a Windows™ word processor, double clicking on an individual word causes that word to be selected for additional commands. For example, a user may double click on a word and then select the "delete" key. Thereby the whole selected word is deleted in a single keystroke.

The right mouse button also has been assigned typical functionality, especially in more recently developed applications. For example, in many Windows™ word processing systems, the right mouse button automatically accesses a menu structure having the commands the user is most likely to next use. As described above, a user may select a word by double clicking on it with the left mouse button. Then, while still pointing at the selected word, the user may single click on the word with the right mouse button. Thereby a menu appears giving format options, editing options, and display options. The use of the right mouse button eases the interaction with the graphical user interface.

The mouse is also used to provide more sophisticated control of the graphical user interface. For example, the mouse may be used to select large areas of text or other graphical items. In such a manner, for example, the user first positions the graphical cursor in an upper left-hand corner of the block desired to be selected, clicks and holds the left mouse button and then drags the mouse to cause the image to move a lower right-hand position. An imaginary rectangular box is created extending from the upper left-hand position to the lower right-hand position. Thereby, when the left mouse button is released, the text or other items within the imaginary box are selected for further operation.

The mouse provides additional features in particularly graphical intensive applications. For example, in a drafting package, the mouse may be used to draw or manipulate lines or other graphical structures. Further, although the Windows™ operating system generally defines the typical uses of the mouse, each application program may extend the functionality of the mouse.

With the proliferation of graphical user interfaces on computing devices, these graphical user interfaces are showing up in locations where it may be inconvenient or otherwise undesirable to use a mouse. For example, computers including personal computers are currently used in dusty or dirty environments, such as by employees in a vehicle service facility, or in a facility where manufacturing process control systems are performed.

Such personal computers often reside within the service or manufacturing facility, and are operated by service or manufacturing personnel, or laborers. Often, such environments are hostile to the use of a mouse. In particular, a mouse requires a clean working environment since a dirty working environment causes grime to accumulate on the roller ball, thereby causing the mouse to fail. In such a manner, a mouse used in a service or manufacturing facility is prone to failure, and therefore the use of a mouse is impractical.

Further, it is often difficult and inconvenient for the service and manufacturing personnel to discontinue performing their assigned tasks, and provide the required input to the computer system. Therefore, information that should be entered into computer may not be entered, or the servicing or manufacturing personnel may be interrupted from their normal assignment to provide input to the personal computer. Either way, the operation of the facility is made less efficient. In such a manner the use of a mouse is inefficient, at best.

Indeed, there are numerous environments where it is inconvenient or impractical to use a mouse. In these circumstances the user must provide undesirably cumbersome and awkward alternatives, or forego entirely the use of some system or application.

Therefore, it would be highly desirable to have a new and improved graphical input device for use with a graphical user interface for enabling more conveniently and efficiently a user to input graphical information and commands. However, as already indicated, any substitute graphical input device must fully implement the functionality of a conventional mouse to interact efficiently and completely with modern graphical operating systems and application programs. If the graphical input device does not emulate all mouse functions, the user may become "stranded" in an application and be forced to resort to using the mouse or otherwise work in an inconvenient manner.

Thus, it would be highly advantageous to have a new and improved graphical input device, which can emulate a prerecorded sequence of computer mouse functions, and which can be utilized in almost any environment including dusty and dirty service and manufacturing environments. Alternately, any specific individual mouse-like input can be directly entered and performed, such as controlling the movement of a cursor, a point and click, a double click, a drag and all other mouse functions, in this case without the need for pre-recording or storing any commands. In this regard, in order to be fully mouse compatible, such an improved input device should be capable of interacting directly and immediately with the computer to execute any and all desired pointing functions in a similar manner as a mouse. Such an improved device can not only perform the direct and immediate control of a cursor, but also be operated in hostile environments where the operation of a conventional mouse would not be recommended.

SUMMARY OF THE INVENTION

It is therefore an object of the present invention to provide a method and a system for controlling a computing application program in a reliable and efficient manner.

It is another separate object of the present invention to provide an efficient technique for overlaying a voice command mouse emulation method, on top of any mouse driven application program without the need to modify the application program.

It is another separate object of the present invention to provide for the full emulation of mouse functionality, including relative cursor movements keyed by a sequence of audible cursor movement control commands.

It is another separate object of the present invention to provide a very robust voice input system that can be used in any industrial or commercial environment so that the background noise, the location of the operator, the inability of using hands and/or eyes, and the need for unlimited mobility does not affect the system operation.

Briefly, in accordance with the present invention, there is provided a new and improved voice input system and method which provide the ability to reliably enter voice activated mouse emulation commands.

A voice input system has a microphone coupled to a computing device, with the computing device typically operating a graphical application. A user speaks voice commands into the microphone, with the computing device operating a voice command module that interprets the voice command and causes the graphical or non-graphical application to be commanded and controlled consistent with the use of a physical mouse. In one form of the invention, voice commands are overlayed on normal command points of the application program. Such voice commands are stored in a separate voice command repository, with an edit mode provided to create new voice command sequences and to edit existing voice command sequences.

The inventive system enables an application program to be controlled by injecting interactive voice command dialogs (Macros) which can reliably emulate mouse and/or keyboard events. These Macros include the capability of providing a separate visual and/or audio feedback or prompting response to a voice command so that the operator is certain that his/her voice command was not misinterpreted by the voice recognition software. Moreover, in the case of a prompt feedback, the operator may choose to allow or deny the impending mouse event. In order to provide a robust system, a background noise canceling microphone, with wireless transmission between the operator and the computer, is employed with a synthesized sound feedback for each command.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
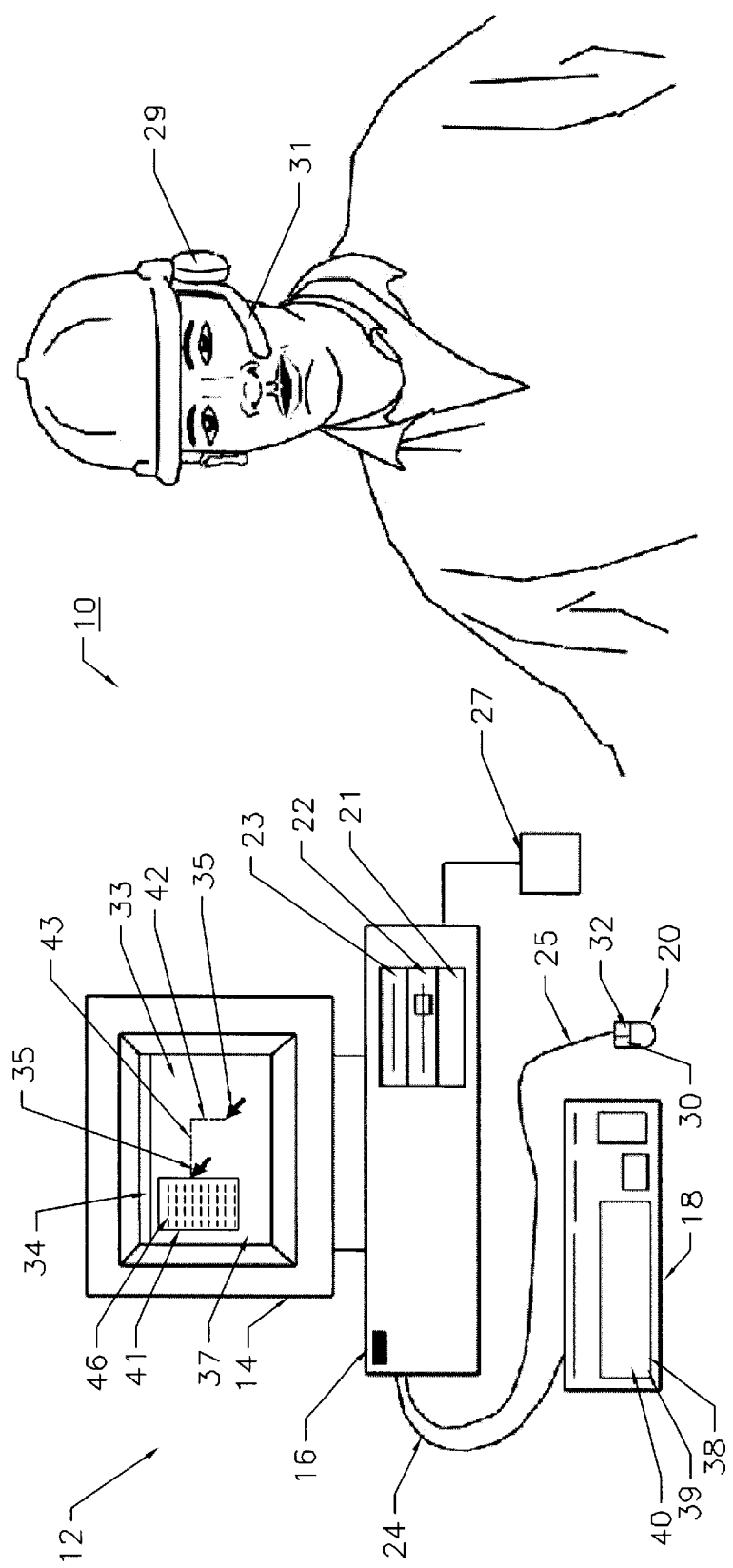
FIG. 1 shows a diagram of a voice actuated mouse emulation system made in accordance with the present invention.

FIG. 1 shows a system 10 for implementing mouse functions using voice command. In such a manner, the user 15 speaks voice commands into a wireless background noise canceling microphone 31 thereby commanding or controlling the active window 37 of the computer 12. By simply speaking voice commands, the user 15 fully emulates the functionality of a physical mouse or keyboard, including the ability to freely manipulate and move a graphical cursor 35.

The system 10 for implementing mouse functionality using voice commands is implemented on a computing device, most typically a personal computer 12. Those skilled in the art will recognize that graphical user interfaces are common on many types of computer devices, including computers for industrial control and imbedded computer systems. The personal computer 12 is operating the common Microsoft Windows™ graphical user interface. The Windows™ graphical interface is identifiable on the personal computer 12 by the Windows™ command bar 34. Generally, the personal computer 12 comprises a monitor display 14 and a base unit 16. A microphone 31 provides voice inputs to a computer 12 while a speaker 29 allows the computer 12 to provide audio feedback to the user 15. Standard inputs are provided by the keyboard 18 and the mouse 20.

With the system 10 generally described, each component is now addressed in more detail. The base unit 16 of the personal computer 12 has a hard disk drive 21 for long-term storage of applications and data. The base unit 16 may also have additional disk drives such as CD ROM player 22 and floppy disk drive 23. The floppy disk drive 23 is particularly useful for transferring information to and from the personal computer 12.

A keyboard cable 24 connects a keyboard 18 to the base unit 16. A mouse cable 25 connects a mouse 20 to the base unit 16. The interconnection of keyboards and a mouse to a personal computer is well known in the art. The keyboard is a standard computer keyboard having control keys 40. The mouse is a standard two button mouse having a left mouse button 30 and a right mouse button 32.

The display 14 is usually a CRT display, but those skilled in the art recognize that other types of displays such as flat screens may be substituted. Further, those skilled in the art will recognize that some computing devices such as industrial computing devices have computer displays configured for harsh environments. The display 14 when activated, may be displaying a graphical user interface such as the Windows™ operating system. The Windows™ operating system displays operating programs within frames, called windows. The active window is identified with a highlighted border. For example, the display area 33 has an active window 37 identified by a highlighted frame. The highlighted frame of the active window 37 shows the user 15 that keyboard 18 and mouse inputs 20 will be accepted by the program operating within the active window 37.

A speaker 29 is worn over the ear of the user as indicated in FIG. 1, and a noise canceling microphone 31 forms a part of a headset worn by the user. The microphone 31 communicates with a receiver 27 connected to the base unit 16. The microphone 31 and speaker 29 communicate via wireless transmission with the base unit 16 through an interface card called a sound card. The sound card of the computing device accepts the analog voice signal from the microphone 31 and provides an analog amplified signal to the speaker 29. The sound card is configured to accept the standard plug associated with the microphone 31 and the standard plug associated with the speaker 29. In such a manner, the microphone and speaker are conveniently coupled to the computer 12.

To use the system 10, the user 15 speaks voice commands into the microphone 31. The voice commands are names specially selected to provide mouse emulation functionality. For example, the user 15 may speak the voice command "Start Pump 1". Upon recognition by the computer system 12 that a valid voice command has been received, the computer device 12 will retrieve a stored voice command sequence and commence playback. In a simple instance, the voice command sequence may only contain a mouse movement and left click on the Start Pump 1 push button of the active application. In a more critical instance the voice command sequence may include a verification dialog prior to emulating a button press at "Start Pump 1."

Thereby, the user 15, by simply saying a particular voice command, is able to emulate a sequence of commands that would normally be entered from the mouse 20.

FIG. 1 shows the user 15 giving a command to the computing device 12. In such a manner, the cursor 35 is shown positioned at a starting point. In this instance, the user may give a voice command, such as "Move-Up-Slowly" to cause the mouse to move up the path 42. When the cursor has moved up sufficiently, the user gives the next voice command, such as "Move-Left-Slowly", to cause the mouse to stop the upward motion and to now move right as indicated by path 43. When the cursor is moving over the command 46, the user says another voice command, such as "Left-Click" to cause the command 46 to be selected and performed. Thereby the user 15 has used only voice commands to implement a sophisticated mouse function.

As described above, the user has used a series of voice commands to fully emulate the mouse functions as if they were performed by a real mouse. The user saw the initial position of the cursor, caused the cursor to move through a designated path, and then stopped the cursor with a command "click".

Figure 2:
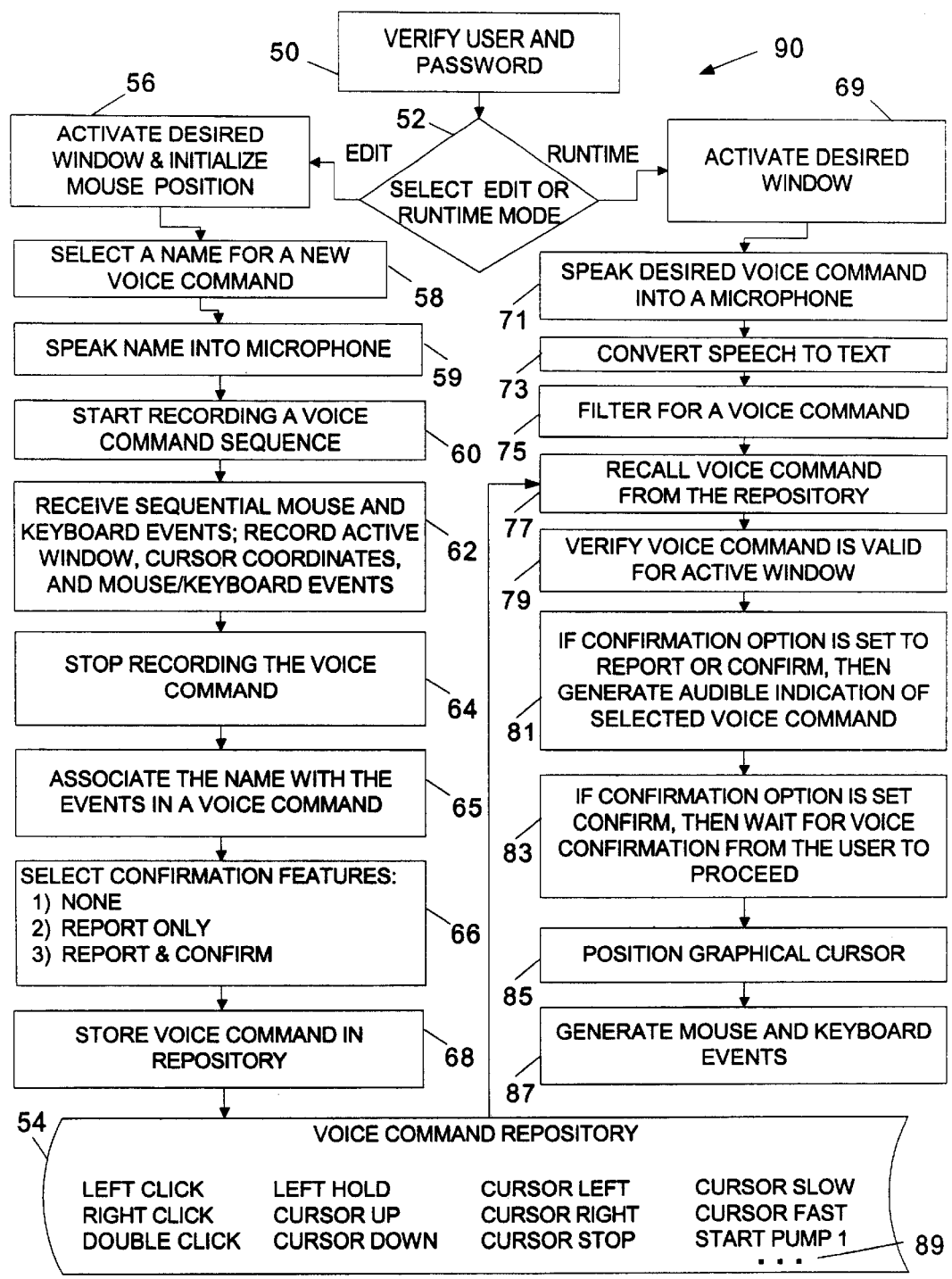
FIGS. 2 and 3 shows block diagrams of a method of using a voice actuated mouse emulation system made in accordance with the present invention.

FIG. 2 shows the functionality of a voice command module 90 constructed in accordance with the present invention. The voice command module 90 operates on the computing device 12 for providing full mouse emulation as described above. Further, the voice command module 90 provides functionality for the creation of voice commands. These creative voice commands may be simple commands implementing a single mouse function, commands implementing mouse functions performed in conjunction with keyboard control functions, or sophisticated mousing functions requiring several individual mouse functions with confirming dialogs.

The voice command module 90 can provide for the verification and authorization of a user before activating the voice command module 90. For example, some users may be authorized to run voice commands, while only supervisor users may be allowed to edit and create commands. In such a manner, block 50 shows that the user is authorized and verified as an initial step in activating the voice command module 90.

Once the user has passed the verification step of block 50 the user selects either an edit mode or a run time mode as indicated in block 52. After authorization in block 50, the voice command module 90 defaults to being in the run time mode so commands may be immediately and conveniently entered without the need for further command inputs or selections. To enter edit mode the user must perform an additional step, such as selecting and double clicking on an icon representing the edit mode function.

To use the voice command module 90 in run time mode, the user first activates the desired window on the computing device as indicated in block 69. By activating a particular application, the user begins the voice command module in a known state. Since in some environments no keyboard or mouse may be provided, the computer system will then typically boot to the known desired state. Alternatively, the user may activate the proper window by use of basic voice commands such as "Move-Left", "Move-Right", and "Select-Window".

After activating the proper window, the user speaks the desired voice command into a microphone as shown in block 71. The user must already be aware of the available voice commands in order to speak a command into the microphone. However, the voice command module 90 may also provide a help function whereby the user may get assistance in using the voice command module 90. For example, by speaking the voice command "Help-Mouse" the voice command module 90 may provide a list of available voice commands 89. The list of available voice commands 89 represents the voice commands as stored in the voice command repository 54. Most likely, the voice command repository is stored on the hard disk 21 of computer 12. However, the voice command repository may come from any local hard drive, a network drive, or may even be accessed from a live Internet connection.

Once the user has spoken the desired voice command, the computing device 12 typically converts the voice command to text. Several types of voice recognition technology are well known in the art and therefore will not be further addressed here. Once the voice command has been converted to text, block 75 provides a filter to recognize the voice command. The filter monitors the converted text for the presence of a voice command. Once the filter finds a voice command in a block 75, the voice command is recalled from the voice command repository 54 as shown in block 77.

The voice command repository 54 contains a list of all available voice commands 89. Voice commands may take the form of simple mouse emulation such as the "Left-Click" and "Double-Click" commands. As discussed above, other voice commands may include the use of keyboard control keys or may even include a series of mouse functions. Block 79 verifies that the selected voice command is valid for the active window. If the voice command is not valid, the voice command is ignored. If the voice command is valid, then the voice command module 90 proceeds to block 81.

Each voice command, when created, allows for the setting of reporting and confirmation options. The reporting option causes the computer 12 to report what command is being performed just before it is performed. For example, if the user 15 gives the command "Left-Click" into the microphone and the "Left-Click" voice command has the reporting option set, then the computer will report "left click" before performing the operation. Preferably, the reporting is done using speaker 29. Thereby, the user will hear the audible report "left click" just before the left click function is performed.

However, in some circumstances it may be desired that the user confirm a mouse function before the function is performed. For example, at a manufacturing environment where a particular function performs a critical operation such as turning off a pump, it may be disastrous if the function is inadvertently performed. Thereby, when the user 15 gives a command such as "Pump-Off" the computer will request that the user confirm the command before continuing. In such a manner, the computer speaker may generate a message such as "say 'yes' to turn off the pump or say 'no' to leave the pump on." By saying yes, the user will cause the voice command module 90 to continue and by saying no will cause the voice command module 90 to ignore the voice command. The text to speech technology used for reporting and confirmation is well know in the art.

Thereby, block 81 shows that for voice commands where the confirmation option is set to report or confirm, then there is an audible indication of the selected command. If the confirmation option is set, as shown in block 83, then the voice command module 90 requires a further confirmation from the user 15 before proceeding.

At this point the voice command is activated, thereby positioning the graphical cursor as indicated in block 85 and generating mouse and any supporting keyboard events as indicated in block 87. After performing the selected voice command, the voice command module 90 resets and is available immediately to accept the next voice command. Thereby, the user may quickly and efficiently control the graphical user interface for a computer device.

Turning now to discuss the edit mode in more detail. If the user selects the edit mode after being verified and authorized in block 50, then the user is permitted to create and edit voice commands. To create a voice command the user positions the graphical cursor of the graphical user interface using the standard mouse 20. Again, using the mouse 20 the user 15 activates the desired window thereby placing the application software in a known, initialized state as shown in block 56. The user then selects a name for a new voice command as indicated in block 58. The name selected should be descriptive of the function for the voice command. For example, if the voice command is to perform a left click function, then it would be logical to call the new voice command "Left-Click."

With the name selected, the user speaks the selected voice command name into the microphone as indicated in block 59. Once the voice command module 90 has accepted the name for the new voice command, the event sequence for the new voice command is started in block 60. The user then proceeds to use the mouse 20 in conjunction with the keyboard 18 to perform a particular mouse function.

The events generated by the mouse and/or keyboard are received by the voice command module 90 as shown in block 62. Also as indicated, the voice command module 90 records the active window, the cursor coordinates, and all the mouse and/or keyboard events. When the mouse function has been completed, the user stops recording the new voice command in block 64. Then, as indicated in block 65, the voice command module associates the name spoken in block 59 with the sequence of events as received in block 62.

The user is then presented with a dialogue screen where a user indicates whether or not this voice command should be reported before execution. In a similar manner, the user is presented with a dialogue screen where the user indicates if this voice command should be confirmed before activation. Both the reporting and confirmation functions are shown in block 66. Then as indicated in block 68, the new voice command is stored in the repository 54 under the name as spoken in line 59. Thereby, the name appears in the list of available voice commands 89.

The voice command repository 54 is sized to accept at least 50 voice commands. Each voice command is preferably configured to store at least 50 mouse, keyboard, or mouse/keyboard events. Ideally, the voice command module 90 is designed such that the limitations on the number of voice commands stored in the repository and the number of events stored in each voice command is limited only by available system resources. Thereby, the voice command module automatically scales for use on larger or smaller systems.

In an example for using the edit mode, a user desires to create a voice command that will move the cursor leftward from any starting position. After accessing the edit mode and verifying access rights with a password, the user activates a window and positions the cursor to the far right in the window. The user them selects a name for the macro, for example, "Move-Cursor-Left", and speaks this voice command name into the microphone. The user then activates the recording capability, usually by giving a mouse or keyboard command, and then moves the mouse left from its initial position, causing the cursor to move left within the active window. When the cursor is at the far left of the active window, then the user stops the recording function and the system stores the new voice command.

Thereafter in runtime mode, whenever the user speaks the command "Move-Cursor-Left", the cursor will begin moving left. To stop the left motion, the user can give any other command, such as "Left-Click" or a voice command specifically created to stop cursor movement.

Those skilled in the art will recognize that such a "Move-Cursor-Left" function could be created in other ways. For example, the move-left functionality could be implemented by coding the functionality into a function that is linked to the voice command name. In such a manner basic cursor control functionality may be implemented in an efficient manner with a consistent command naming structure. Thereby, the basic functionality to emulate a mouse would be coded into each command, while more application specific functionality would be implemented using the edit mode as described above.

In a particular application of the voice command module 90, the voice command module 90 permits a user to overlay a voice command on a particular screen location. The overlay functionality is a simple and efficient way to navigate about a graphic user interface. To implement an overlay, a user uses edit mode to place the graphical cursor on the desired icon, command, or object as displayed in a software application. The user assigns a name to that coordinate position and stores that name as a voice command. Thereby, at a later time, when in run time mode, the user speaks the name associated with the location, the graphical cursor immediately jumps to and points to the desired coordinate location.

For example, in an industrial control application, a cursor may be used to select various valves for manipulation. Each valve may be defined with an overlay name. Thereby, if the user desires to select valve No. 5 the user would simply speak the statement "Valve-Number-Five" into the microphone and the cursor would jump to the graphical icon representing valve No. 5. At that point the user then could recite another voice command such as "Pump-Off." For such a critical operation, the voice command may then be reported and confirmed before performing the voice command and turning off the pump. In such a manner, an operator may efficiently and easily jump to the graphical icon for valve No. 5 and turn off the valve without the need for interacting with the mouse.

The voice command module 90 may also allow for indication of speed at which each voice command is to be operated. For example, a "Move-Left" or "Move-Right" command may be modified in a manner so that the user could specify "Move-Right-Fast" or "Move-Left-Slow" to adjust the speed at which the moves occur. In such a manner, the relative speed of graphical input and manipulation may be adjusted in a manner consistent with the use of a physical mouse.

The voice activated mouse system may be provided with a set of basic voice commands for emulating the typical and basic mouse functions. As needed, the user may create additional voice commands to supplement the basic set. Further, the developer of a particular software application may provide additional voice commands specific to that application.

A preferred implementation of the voice commanded graphical input method and device will have functional capabilities as described in the following paragraphs.

Operating System and Programming Guidelines. The voice module runs under the Windows NT™ 4.0, Windows 95™ and Windows 98™ operating systems. The voice module uses standard application programming interfaces (API's) for programming tasks.

Edit Mode Usage. In Edit Mode, the user is allowed to define voice activated application macros. The macros are associated with a given window/application and text for a voice command. The user is allowed to enter a recording mode and record mouse and keyboard events. The user is allowed to stop recording at any time and save the macro. Additional attributes for each macro may also be defined. Mouse event screen coordinates are stored relative to the original of the window in which the event is recorded.

Command Recording Capacity. The voice module is capable of recording 50 voice-input commands. Each command is capable of storing 50 events. The voice module design makes these limits depend upon system resources only, i.e. be only limited by available application memory.

Command Attributes. The voice command has additional attributes, including a confirmation attribute. The confirmation attribute allows for the following three states; 1, no confirmation when the command is recognized, 2.—an audio/visual feed back (Audio Feedback Dialog) when the command is recognized, followed by the macro playback and 3.—an audio/visual confirmation (Audio Confirmation Dialog) when the command is recognized, requiring a confirmation action (such as a spoken keyword, i.e. 'OK' or 'Go') or cancel action (i.e. spoken word 'Cancel' or 'No') before the macro is played.

The Audio Feedback and Audio Confirmation Dialogs are capable of playing back a prerecorded sound (wav file), or providing a text-to-speech interpretation of a given set of text. In Edit Mode, the user is allowed to record any sound that can be used in these confirmation dialogs.

Edit Mode and Application Concurrent Usage Allowed. The Edit Mode voice module and the target are capable of running concurrently, allowing the user to reference the application screens while recording voice commands.

Events Simulated. The system allows simulation of mouse and keyboard events. The software structure however does not preclude the addition of other events.

Voice Command Storage. The voice command macros are saved to disk files. The user may also delete macros from the system. Each application may have its own collection of choice macros stored in a single file.

Run Time Mode. The system has a Run Time Mode. It will recognize voice-input commands defined using the Edit Mode.

Run Time Mode Setup. In Run Time mode, the voice module allows the user to load application voice macro packages created using the Edit Mode. These voice macros will then become active.

Figure 3:
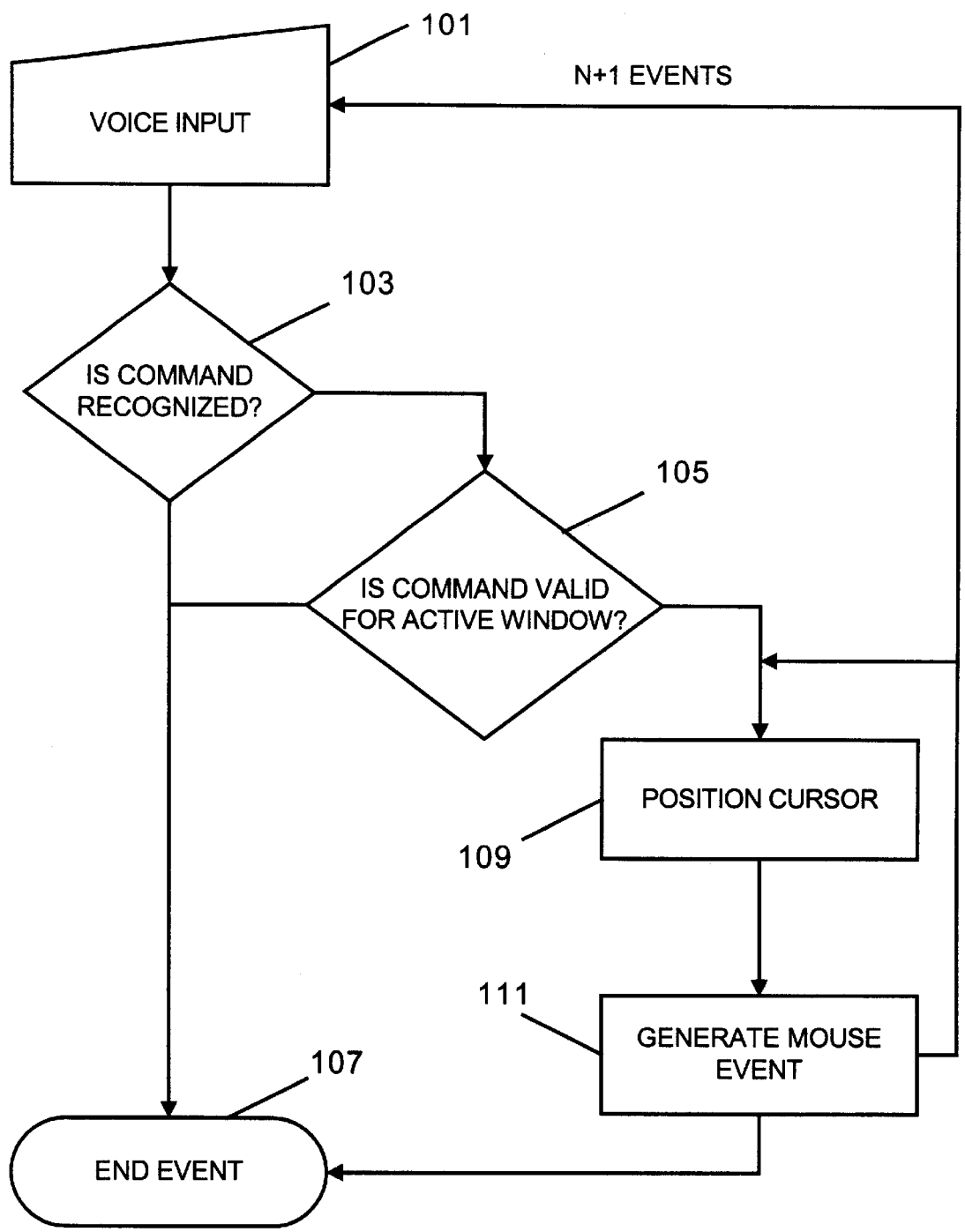

Run Time Mode Operation. In Run Time Mode, the system processes voice-input commands as shown in FIG. 3. A voice input is accepted as shown at block 101. If a voice-input command is recognized in block 103, the system checks that the voice-input command is valid input for the active window in block 105. If the command is valid for the active window, the system will check the attributes of the command to determine the appropriate processing.

If the command requires an audio feedback dialog, the appropriate feedback is provided to the user, then the voice command is replayed to the target application. If the command requires an Audio Confirmation Dialog, the feedback is given and the voice macro is replayed upon receipt and recognition of a confirmation action. Other macros will be played back directly to the target application, with no user feedback provided.

Upon activation and replay, the voice command causes the cursor to be positioned as indicated in block 109 and the mouse events to generated as shown in block 111. Of course, if the voice command also has keyboard events, these are also generated. If the command is not recognized, not valid for the active window, or completed, the voice command ends as shown in block 107. Further, the replay of the voice command may be canceled when a cancel action is received and recognized.

Run Time Macro Playback. When a voice macro is played back to a target application, the events (mouse and keyboard) are sent to the target application in the same order in which they were recorded.

Application Window Positioning is not Fixed. The application window is not required to be in the same location in Run Time Mode as it was in Edit Mode.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for emulating mouse functionality in an active program using human voice, the active program executing on a computer and having a graphical cursor, comprising:
   receiving a voice command at a microphone, the voice command spoken by a human voice and emulating a mouse command;
   repeating the received voice command by said computer for certain cursor locations;
   executing the active program responsive to the received voice command, the execution initiated upon repeating of the voice command;
   receiving at least another voice command at said microphone; and
   confirming with a user the received at least another voice command for other cursor locations; and
   executing the active program in response to receiving confirmation.

2. The method for emulating mouse functionality of claim 1, wherein said at least another voice command further causes the active program to receive an event emulating the click of a mouse, the event emulating the click of a mouse initiating an active program function.

3. The method for emulating mouse functionality of claim 1, wherein the step of repeating is a step of reporting, in response to receiving the voice command.

4. The method for emulating mouse functionality of claim 3, wherein the reporting is audible.

5. The method for emulating mouse functionality of claim 3, wherein the step of confirming with a user reports an industrial control function to be performed.

6. The method for emulating mouse functionality of claim 5, wherein the user confirms verbally using the microphone.

7. The method for emulating mouse functionality of claim 1, wherein said at least another voice command includes commands for implementing a left mouse click, a right mouse click, and a double click.

8. The method for emulating mouse functionality of claim 7, wherein said at least another voice command further includes commands for implementing a mouse drag function, a mouse move function, and a mouse range select function.

9. The method for emulating mouse functionality of claim 1, wherein said at least another voice command includes commands for implementing mouse functions used in conjunction with a keyboard input.

10. The method for emulating mouse functionality of claim 9, wherein the keyboard input is a key selected from the group consisting of a control key, an alt key, and a shift key.

11. The method for emulating mouse functionality of claim 1, further comprising the step of assigning a location name to a position in the active program and moving to said position in response to receiving a voice command comprising the location name.

12. The method for emulating mouse function of claim 1, further including providing an overlay for the active program.

13. The method for emulating mouse function of claim 12, further including editing the overlay at desired locations thereon.

14. The method for emulating mouse function of claim 13, wherein certain ones of the locations are designated for the step of repeating.

15. The method for emulating mouse function of claim 13, wherein other ones of the locations are designated for the step of confirming.

16. The method for emulating mouse function of claim 15, wherein the active program comprises industrial control functions including the control of pumps or valves.

17. A system for controlling an active program using human voice, the active program executing on a computer and having a graphical cursor comprising:
   means, including a microphone, for receiving a voice command of a human voice, the voice command emulating a mouse command;
   means, including said computer, for repeating the received voice command for certain cursor locations;
   means for executing the active program responsive to the received voice command, the cursor movement initiated upon repeating the voice command;
   means, including said microphone, for receiving at least another voice command;
   means for confirming with a user the received at least another voice command for other cursor locations; and
   means for executing the active program in response to receiving confirmation.

18. The system of claim 17, wherein said at least another voice command further causes the active program to receive an event emulating the click of a mouse, the event emulating the click of a mouse initiating an active program function.

19. The system of claim 17, wherein said means for repeating includes means for reporting, in response to receiving the voice command.

20. The system of claim 19, wherein the reporting is audible.

21. The system of claim 19, wherein said means for confirming with a user reports an industrial control function to be performed.

22. The system of claim 21, wherein the user confirms verbally using the microphone.

23. The system of claim 17, wherein said at least another voice command includes commands for implementing a left mouse click, a right mouse click, and a double click.

24. The system of claim 23, wherein said at least another voice command further includes commands for implementing a mouse drag function, a mouse move function, and a mouse range select function.

25. The system of claim 17, wherein said at least another voice command includes commands for implementing mouse functions used in conjunction with a keyboard input.

26. The system of claim 25, wherein the keyboard input is a key selected from the group consisting of a control key, an alt key, and a shift key.

27. The system of claim 17, further comprising means for assigning a location name to a position in the active program and moving to said position in response to receiving a voice command comprising the location name.

28. The system of claim 27, wherein the location name is an overlay name defining an industrial control device.

29. The system of claim 28, wherein certain ones of the locations are designated for the means for repeating.

30. The system of claim 29, wherein other ones of the locations are designated for the means for confirming.

31. The system of claim 17, further including means for providing an overlay for the active program.

32. The system of claim 31, further including means for editing the overlay at desired locations thereon.

* * * * *

UNITED STATES PATENT AND TRADEMARK OFFICE
CERTIFICATE OF CORRECTION

PATENT NO. : 6,424,357 B1  
DATED : July 23, 2002  
INVENTOR(S) : Roberto Frulla and Joseph Kirby It is certified that error appears in the above-identified patent and that said Letters Patent is hereby corrected as shown below:

<u>Title page,</u>
Item [75], change "Calsbad" to -- Carlsbad --

Signed and Sealed this

Twenty-ninth Day of October, 2002

Attest:

Attesting Officer

JAMES E. ROGAN
*Director of the United States Patent and Trademark Office*